UNITED STATES PATENT OFFICE.

TRAUGOTT SANDMEYER, OF BASLE, SWITZERLAND, ASSIGNOR, BY MESNE ASSIGNMENTS, TO THE FARBENFABRIKEN, VORMALS FR. BAYER & CO., OF ELBERFELD, PRUSSIA, AND THE ACTIEN-GESELLSCHAFT FÜR ANILIN FABRIKATION, OF BERLIN, GERMANY.

YELLOW COLOR.

SPECIFICATION forming part of Letters Patent No. 406,670, dated July 9, 1889.

Application filed October 24, 1888. Serial No. 289,074. (Specimens.)

*To all whom it may concern:*

Be it known that I, TRAUGOTT SANDMEYER, of Basle, Switzerland, have invented a certain new and useful Process for the Production of Yellow Colors, Dyeing Cotton without Mordants, of which the following is a specification.

My invention is based upon the discovery that unsymmetric substituted azoxy and azo compounds are obtained by the condensation of substituted aromatic amines with aromatic nitro substances, or by condensation of substituted aromatic nitro substances with aromatic amines by heating them with caustic alkalies. The new base is like sirup. Its nitrate and chloride easily crystallize. The sulphate is scarcely soluble in water. The product thus obtained has to be reduced, then treated with acid, to be diazotized, and to be combined with resorcin, phenol, or their carbolic acids.

To carry out the invention, I boil, for instance, ten kilos of ortho-toluidine with ten kilos of caustic soda under gradual addition of ten kilos of nitro-benzine until the latter has completely disappeared. A red-brown paste is the result, which has to be reduced with zinc-powder after having been diluted with water. I let it stand until it is cold, pour it into concentrated muriatic acid, boil, dilute with water, and filter. Then I add Glauber's salt, to precipitate the sulphate in form of a paste. One hundred kilos of it containing twenty per cent. dry substance are mixed with eighteen kilos of muriatic acid, cooled with ice, and diazotized by addition of nine and one-half kilos of nitrite of sodium. The solution of the diazo compound is poured in a solution of five kilos of caustic soda, twenty kilos of soda, and nineteen kilos of salicylic acid or the corresponding quantity of one of the above-named substances. When the color is forced, I heat and precipitate with salt.

Having thus described my invention, what I claim as new, and desire to secure by Letters Patent, is—

The herein-described process for producing yellow colors (dyeing cotton without mordants) by first boiling ortho-toluidine with caustic soda in proper proportion, then adding thereto gradually nitro-benzine in proper proportion, then reducing the product by means of powdered zinc, then allowing the same to stand till cold, then pour it into muriatic acid, boil, dilute with water, and then filter, then add Glauber's salt, then diazotized by the addition of nitrate of sodium, the whole then poured into a solution of caustic soda, soda, and salicylic acid, then heat the whole, and precipitate with salt, substantially as herein described.

In testimony whereof I hereunto sign my name, in the presence of two subscribing witnesses, this 25th day of September, 1888.

TRAUGOTT SANDMEYER.

Witnesses:
GEORGE GIFFORD,
CHARLES A. RICHTER.